United States Patent
Kodama et al.

(10) Patent No.: US 10,913,883 B2
(45) Date of Patent: Feb. 9, 2021

(54) COOLANT COMPOSITION AND METHOD OF OPERATING INTERNAL COMBUSTION ENGINE USING THE SAME

(71) Applicant: TOYOTA JIDOSHA KABUSHIKI KAISHA, Toyota (JP)

(72) Inventors: Yasuaki Kodama, Toyota (JP); Shogo Kamenoue, Wakayama (JP); Kazuhito Yaeda, Shizuoka (JP); Yoichiro Yoshii, Shizuoka (JP); Masayuki Nagasawa, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 16/090,041

(22) PCT Filed: Apr. 3, 2017

(86) PCT No.: PCT/IB2017/000371
§ 371 (c)(1),
(2) Date: Sep. 28, 2018

(87) PCT Pub. No.: WO2017/175053
PCT Pub. Date: Oct. 12, 2017

(65) Prior Publication Data
US 2020/0308464 A1    Oct. 1, 2020

(30) Foreign Application Priority Data
Apr. 4, 2016 (JP) .................... 2016-075081

(51) Int. Cl.
*C09K 5/10* (2006.01)
*F01P 3/00* (2006.01)

(52) U.S. Cl.
CPC ............ *C09K 5/10* (2013.01); *F01P 3/00* (2013.01); *F01P 2003/001* (2013.01)

(58) Field of Classification Search
CPC ........ C09K 5/10; C09K 5/20; F01P 2011/068; F01P 3/00
See application file for complete search history.

(56) References Cited

U.S. PATENT DOCUMENTS

| | | | | |
|---|---|---|---|---|
| 6,277,385 B1 * | 8/2001 | Luke | ........................ | A61K 8/42 424/401 |
| 6,607,694 B1 * | 8/2003 | Blakemore | ............... | C02F 1/70 123/198 E |
| 2003/0127624 A1 | 7/2003 | Mizutani et al. | | |
| 2004/0091654 A1 * | 5/2004 | Kelly | ..................... | C02F 1/688 428/35.7 |
| 2015/0211407 A1 | 7/2015 | Hirai et al. | | |
| 2019/0194516 A1 * | 6/2019 | Kodama | .................. | C09K 5/10 |

FOREIGN PATENT DOCUMENTS

| | | |
|---|---|---|
| DE | 19743434 A1 | 4/1999 |
| EP | 2549575 A1 | 1/2013 |
| JP | 51-35681 A | 3/1976 |
| JP | 08-183950 A | 7/1996 |
| JP | 2010-270256 A | 12/2010 |
| JP | 2014-012831 A | 1/2014 |
| JP | 2014-189736 A | 10/2014 |
| JP | 2014-189737 A | 10/2014 |
| JP | 2015-074669 A | 4/2015 |
| JP | 2016-124931 A | 7/2016 |
| JP | 2017-132923 A | 8/2017 |
| JP | 2017-186423 A | 10/2017 |
| WO | 01/070900 A1 | 9/2001 |
| WO | 2013/183161 A1 | 12/2013 |
| WO | 2016/103027 A1 | 6/2016 |
| WO | 2017/175052 A1 | 10/2017 |

* cited by examiner

*Primary Examiner* — Long T Tran
(74) *Attorney, Agent, or Firm* — Sughrue Mion, PLLC

(57) ABSTRACT

A coolant composition includes a viscosity improving agent and a base. The viscosity improving agent includes at least one nonionic surfactant and at least one anionic surfactant represented by the following Formula (1) of $R^1O$—$(R^2O)_m$—$SO_3M$. The base is formed of water and/or at least one alcohol selected from the group consisting of a monohydric alcohol, a dihydric alcohol, a trihydric alcohol, and a glycol monoalkyl ether. $R^1$ represents a linear or branched alkyl group having 16 to 24 carbon atoms or a linear or branched alkenyl group having 16 to 24 carbon atoms, $R^2$ represents an ethylene group or a propylene group, m represents an average addition molar number of $R^2O$ which is a number of 0.5 to 10, and M represents a cation or a hydrogen atom. A shear viscosity of the coolant composition is 8.5 mPa·s or higher at 25° C. and is 2.0 mPa·s or lower at 100° C.

7 Claims, No Drawings

COOLANT COMPOSITION AND METHOD OF OPERATING INTERNAL COMBUSTION ENGINE USING THE SAME

BACKGROUND OF THE INVENTION

1. Field of the Invention

The present invention relates to a coolant composition capable of improving the fuel efficiency of an internal combustion engine, and a method of operating an internal combustion engine using the coolant composition.

2. Description of Related Art

As a coolant for cooling an automotive engine or the like, various products are known. Among these, water is preferable because it has the highest cooling performance as the coolant for an engine. However, pure water is frozen at 0° C. or lower. In consideration of the above-described circumstances, a coolant composition has been used, in which a glycol such as ethylene glycol as a base for obtaining anti-freezing properties is diluted with water to obtain a required freezing point, and various additives for preventing deterioration of metal, rubber, resins, and the like, which are used for, for example, an engine and a radiator, are optionally added thereto.

However, in a case where a glycol such as ethylene glycol is used, there is a problem in that the viscosity of the coolant composition significantly increases, in particular, at a low temperature. Accordingly, as a technique of the related art for improving viscosity, in general, a technique of reducing viscosity to improve fluidity at a low temperature has been disclosed.

However, in a case where the viscosity is reduced, the thickness of a boundary layer between a coolant and a bore wall decreases, and convection is likely to be generated. Therefore, the coolant is likely to absorb heat from the bore wall. As a result, cooling loss increases, which may cause deterioration in fuel efficiency. On the other hand, in order to reduce cooling loss by decreasing heat radiation, a configuration of increasing the concentration of a glycol such as ethylene glycol to increase the viscosity of a coolant at a low temperature may be adopted. In this case, however, cooling performance at a high temperature is insufficient, which may cause overheating.

In order to solve the above-described problems, for example, International Publication WO 2013/183161 discloses a coolant composition having a kinetic viscosity in a specific range and a method of operating an internal combustion engine using the coolant composition. By setting the kinetic viscosity of the coolant composition in the specific range, cooling loss at a low temperature can be reduced, and cooling performance at a high temperature can be maintained. Japanese Patent Application Publication No. 2010-270256 (JP 2010-270256 A) discloses a coolant composition including water and a surfactant having a clouding point, in which a coolant composition having high cooling performance and anti-freezing properties can be obtained by adding a surfactant having a clouding point at a predetermined ratio. Japanese Patent Application Publication No. 2014-189736 (JP 2014-189736 A) discloses a coolant composition including an alkyl ether and water and/or a water-soluble organic solvent. By further increasing the kinetic viscosity of a coolant immediately after the operation of an engine, cooling loss can be reduced such that the engine can be rapidly heated to an optimum temperature. Japanese Patent Application Publication No. 2014-189737 (JP 2014-189737 A) discloses a coolant composition including two alkyl ethers and water and/or a water-soluble organic solvent. By further increasing the kinetic viscosity of a coolant immediately after the operation of an engine, cooling loss can be reduced such that the engine can be heated to an optimum temperature. Japanese Patent Application Publication No. 2015-74669 (JP 2015-74669 A) discloses a coolant composition including three alkyl ethers and water and/or a water-soluble organic solvent. By further increasing the kinetic viscosity of a coolant immediately after the operation of an engine, cooling loss can be reduced such that the engine can be rapidly heated to an optimum temperature. Japanese Patent Application Publication No. 2014-12831 (JP 2014-12831 A) discloses a coolant composition in which a nonionic surfactant is used as a viscosity improving agent. In the coolant composition, a kinetic viscosity is 8.5 mm$^2$/sec or higher at 25° C. and 2.0 mm$^2$/sec or lower at 100° C.

SUMMARY OF THE INVENTION

As described above, various viscosity improving agents have been used as an additive of a coolant. However, in order to improve the fuel efficiency of an internal combustion engine, it is required that an increase in viscosity at a high temperature is small and cooling performance at a high temperature is maintained, and concurrently it is also required that warm-up performance at a low temperature is improved by increasing the viscosity and reducing cooling loss at a low temperature.

The invention provides a coolant composition capable of improving the fuel efficiency of an internal combustion engine, and a method of operating an internal combustion engine using the coolant composition.

The present inventors found that, by using a specific anionic surfactant in combination with a nonionic surfactant, an increase in viscosity at a high temperature is small and cooling performance at a high temperature can be maintained, and concurrently warm-up performance at a low temperature can be improved by increasing the viscosity and reducing cooling loss at a low temperature; as a result, the fuel efficiency of an internal combustion engine can be improved.

A first aspect of the invention relates to a coolant composition including a viscosity improving agent and a base. The viscosity improving agent includes at least one nonionic surfactant and at least one anionic surfactant represented by the following Formula (1).

$$R^1O\text{—}(R^2O)_m\text{—}SO_3M \qquad (1)$$

$R^1$ represents a linear or branched alkyl group having 16 to 24 carbon atoms or a linear or branched alkenyl group having 16 to 24 carbon atoms, $R^2$ represents an ethylene group or a propylene group, m represents an average addition molar number of $R^2O$ which is a number of 0.5 to 10, and M represents a cation or a hydrogen atom.

The base is formed of water and/or at least one alcohol selected from the group consisting of a monohydric alcohol, a dihydric alcohol, a trihydric alcohol, and a glycol monoalkyl ether, in which a shear viscosity is 8.5 mPa·s or higher at 25° C. and is 2.0 mPa·s or lower at 100° C.

The nonionic surfactant may be at least one selected from the group consisting of polyoxyalkylene alkyl ether, polyoxyalkylene alkyl phenyl ether, polyoxyalkylene polyol ether, polyoxyalkylene alkyl amino ether, polyoxyalkylene fatty acid ester, polyoxyalkylene sorbitan ester, and polyoxyalkylene fatty acid amide.

The polyoxyalkylene alkyl ether may be a compound represented by the following Formula (2).

$R^3$ represents a linear or branched alkyl group having 12 to 24 carbon atoms or a linear or branched alkenyl group having 12 to 24 carbon atoms, $R^4$ represents an ethylene group or a propylene group, and n represents an average addition molar number of $R^4O$ which is a number of 0.5 to 20.

A content of the viscosity improving agent may be 0.05 to 10 parts by mass with respect to 100 parts by mass of the coolant composition.

A mass ratio (nonionic surfactant/anionic surfactant) of the nonionic surfactant to the anionic surfactant may be 0.1 to 5.

The coolant composition may further include a rust inhibitor.

A second aspect of the invention relates to a method of operating an internal combustion engine in which the above-described coolant composition is used as a coolant.

DETAILED DESCRIPTION OF EMBODIMENTS

A coolant composition according to an embodiment of the invention includes a viscosity improving agent, and the viscosity improving agent includes at least one nonionic surfactant and at least one anionic surfactant represented by Formula (1). As a result, the coolant composition has a specific shear viscosity at a low temperature and a high temperature. In the present invention, the low temperature refers to 25° C., and the high temperature refers to 100° C. In the coolant composition according to the embodiment, various viscosity improving agents may be used alone or in a combination of two or more kinds.

The anionic surfactant represented by Formula (1) which is used as the viscosity improving agent in the coolant composition according to the embodiment has the following structure.

In Formula (1), $R^1$ represents a linear or branched alkyl group having 16 to 24 carbon atoms or a linear or branched alkenyl group having 16 to 24 carbon atoms, $R^2$ represents an ethylene group or a propylene group, m represents an average addition molar number of $R^2O$ which is a number of 0.5 to 10, and M represents a cation or a hydrogen atom.

Regarding $R^1$, the alkyl group may be linear or branched and is preferably linear from the viewpoint of exhibiting the specific shear viscosity at the low temperature and the high temperature. The number of carbon atoms in the alkyl group is 16 to 24, preferably 18 to 22, and more preferably 20 to 22.

Regarding $R^1$, the alkenyl group may be linear or branched and is preferably linear from the viewpoint of exhibiting the specific shear viscosity at the low temperature and the high temperature. The number of carbon atoms in the alkenyl group is 16 to 24, preferably 18 to 22, and more preferably 20 to 22.

Specific examples of $R^1$ include an alkyl group such as a cetyl group, a margaryl group, an isostearyl group, a 2-heptylundecyl group, a stearyl group, an arachidyl group, a behenyl group, or a lignoceryl group; and alkenyl group such as an oleyl group. Among these, a cetyl group, a stearyl group, an arachidyl group, or a behenyl group is preferable, and a behenyl group is more preferable.

$R^2$ represents an ethylene group or a propylene group and preferably an ethylene group from the viewpoint of exhibiting the specific shear viscosity at the low temperature and the high temperature.

m represents an average addition molar number of $R^2O$. From the viewpoint of exhibiting the specific shear viscosity at the low temperature and the high temperature, m represents a number of 0.5 to 10, preferably a number of 1 to 8, more preferably a number of 2 to 7, and still more preferably a number of 3 to 6.

M represents a cation or a hydrogen atom and preferably a cation. Specific examples of the cation include an alkali metal ion and an ammonium ion, and specific examples of the alkali metal include lithium, sodium, and potassium. Among these, sodium or potassium is preferable.

In an embodiment of the present invention, it is preferable to use an anionic surfactant represented by Formula (1) in which $R^1$ represents a linear alkyl group having 18 to 22 carbon atoms, $R^2$ represents an ethylene group, m which represents an average addition molar number of $R^2O$ represents a number of 2 to 7, and M represents a sodium ion or a potassium ion. In an embodiment of the present invention, it is more preferable to use an anionic surfactant represented by Formula (1) in which $R^1$ represents a linear alkyl group having 20 to 22 carbon atoms, $R^2$ represents an ethylene group, m which represents an average addition molar number of $R^2O$ represents a number of 3 to 6, and M represents a sodium ion or a potassium ion.

Specific examples of the anionic surfactant represented by the formula (1) include $C_{18}H_{37}O-(CH_2CH_2O)_3-SO_3Na$, $C_{18}H_{37}O-(CH_2CH_2O)_3-SO_3K$, $C_{22}H_{45}O-(CH_2CH_2O)_4-SO_3Na$, $C_{22}H_{45}O-(CH_2CH_2O)_4-SO_3K$, $C_{18}H_{37}-(CH_2CH_2O)_3-SO_3H$, and $C_{22}H_{45}O-(CH_2CH_2O)_4-SO_3H$.

From the viewpoint of exhibiting the specific shear viscosity at the low temperature and the high temperature, it is preferable that the nonionic surfactant which is used as the viscosity improving agent in the coolant composition according to the embodiment includes a polyoxyalkylene group. Specific examples of the nonionic surfactant include at least one selected from the group consisting of polyoxyalkylene alkyl ether, polyoxyalkylene alkyl phenyl ether, polyoxyalkylene polyol ether, polyoxyalkylene alkyl amino ether, polyoxyalkylene fatty acid ester, polyoxyalkylene sorbitan ester, and polyoxyalkylene fatty acid amide. Among these, polyoxyalkylene alkyl ether is preferable.

It is preferable that the polyoxyalkylene alkyl ether is a compound represented by the following Formula (2).

In Formula (2), $R^3$ represents a linear or branched alkyl group having 12 to 24 carbon atoms or a linear or branched alkenyl group having 12 to 24 carbon atoms, $R^4$ represents an ethylene group or a propylene group, and n represents an average addition molar number of $R^4O$ which is a number of 0.5 to 20.

Regarding $R^3$, the alkyl group may be linear or branched and is preferably linear from the viewpoint of exhibiting the specific shear viscosity at the low temperature and the high temperature. The number of carbon atoms in the alkyl group is 12 to 24, preferably 16 to 22, and more preferably 20 to 22.

Regarding $R^3$, the alkenyl group may be linear or branched and is preferably linear from the viewpoint of exhibiting the specific shear viscosity at the low temperature and the high temperature. The number of carbon atoms in the alkenyl group is 12 to 24, preferably 16 to 22, and more preferably 20 to 22.

Specific examples of $R^3$ include an alkyl group such as a lauryl group, a myristyl group, a cetyl group, a margaryl group, an isostearyl group, a 2-heptylundecyl group, a stearyl group, an arachidyl group, a behenyl group, or a lignoceryl group; and alkenyl group such as an oleyl group. Among these, a cetyl group, a stearyl group, or a behenyl group is preferable, and a stearyl group or a behenyl group is more preferable.

$R^4$ represents an ethylene group or a propylene group and preferably an ethylene group from the viewpoint of exhibiting the specific shear viscosity at the low temperature and the high temperature.

n represents an average addition molar number of $R^4O$. From the viewpoint of exhibiting the specific shear viscosity at the low temperature and the high temperature, n represents a number of 0.5 to 20, preferably a number of 1 to 15, more preferably a number of 2 to 11, and still more preferably a number of 3 to 8.

In an embodiment of the invention, it is preferable to use polyoxyalkylene alkyl ether represented by Formula (2) in which $R^3$ represents a linear alkyl group having 16 to 20 carbon atoms, $R^4$ represents an ethylene group, and n which represents an average addition molar number of $R^4O$ represents a number of 1 to 18.

In an embodiment of the invention, it is preferable to use polyoxyalkylene alkyl ether represented by Formula (2) in which $R^3$ represents a linear alkyl group having 20 to 24 carbon atoms, $R^4$ represents an ethylene group, and n which represents an average addition molar number of $R^4O$ represents a number of 5 to 12.

Specific examples of the polyoxyalkylene alkyl ether represented by Formula (2) include $C_{18}H_{37}O-(CH_2CH_2O)_6-H$, $C_{22}H_{45}O-(CH_2CH_2O)_7-H$, and $C_{22}H_{45}O-(CH_2CH_2O)_{10}-H$.

In the coolant composition according to the embodiment, the viscosity improving agent includes at least one nonionic surfactant and at least one anionic surfactant represented by Formula (1). Therefore, the shear viscosity can be adjusted to be within the predetermined range. The shear viscosity at 25° C. can be adjusted to be high using, for example, a method of increasing the content of the viscosity improving agent, a method of increasing the content of the anionic surfactant, or in a case where the base includes an alcohol, a method of increasing the content of the alcohol. The shear viscosity at 100° C. can be adjusted to be low using, for example, a method of decreasing the content of the viscosity improving agent, a method of adjusting a content ratio of the anionic surfactant to the nonionic surfactant, in a case where the base includes an alcohol, a method of decreasing the content of the alcohol.

The content of the anionic surfactant represented by Formula (1) with respect to 100 parts by mass of the coolant composition according to the embodiment is preferably 0.01 parts by mass or more, more preferably 0.02 parts by mass or more, still more preferably 0.03 parts by mass or more, still more preferably 0.05 parts by mass or more, still more preferably 0.15 parts by mass or more, and still more preferably 0.25 parts by mass or more from the viewpoint of adjusting the shear viscosity of the coolant composition at the low temperature and the high temperature (in particular, at the low temperature) to be in the predetermined range, and is preferably 9.99 parts by mass or less, more preferably 5 parts by mass or less, still more preferably 3 parts by mass or less, still more preferably 2 parts by mass or less, still more preferably 1 part by mass or less, and still more preferably 0.5 parts by mass or less from the viewpoints of improving cooling performance and suppressing deposition. From these viewpoints, the content of the anionic surfactant represented by Formula (1) is preferably 0.01 to 9.99 parts by mass, more preferably 0.02 to 5 parts by mass, still more preferably 0.03 to 3 parts by mass, still more preferably 0.05 to 2 parts by mass, still more preferably 0.15 to 1 part by mass, and still more preferably 0.25 to 0.5 parts by mass.

The content of the nonionic surfactant with respect to 100 parts by mass of the coolant composition according to the embodiment is preferably 0.01 parts by mass or more, more preferably 0.02 parts by mass or more, still more preferably 0.03 parts by mass or more, still more preferably 0.05 parts by mass or more, still more preferably 0.15 parts by mass or more, and still more preferably 0.25 parts by mass or more from the viewpoint of adjusting the shear viscosity of the coolant composition at the low temperature and the high temperature to be in the predetermined range when used in combination with the anionic surfactant, and is preferably 9.99 parts by mass or less, more preferably 5 parts by mass or less, still more preferably 3 parts by mass or less, still more preferably 2 parts by mass or less, still more preferably 1 part by mass or less, and still more preferably 0.5 parts by mass or less from the viewpoints of improving cooling performance and suppressing deposition. From these viewpoints, the content of the nonionic surfactant is preferably 0.01 to 9.99 parts by mass, more preferably 0.02 to 5 parts by mass, still more preferably 0.03 to 3 parts by mass, still more preferably 0.05 to 2 parts by mass, still more preferably 0.15 to 1 part by mass, and still more preferably 0.25 to 0.5 parts by mass.

The content of the viscosity improving agent with respect to 100 parts by mass of the coolant composition according to the embodiment is preferably 0.05 parts by mass or more, more preferably 0.1 parts by mass or more, still more preferably 0.2 parts by mass or more, still more preferably 0.3 parts by mass or more, and still more preferably 0.38 parts by mass or more from the viewpoint of adjusting the shear viscosity of the coolant composition at the low temperature and the high temperature to be in the predetermined range, and is preferably 10 parts by mass or less, more preferably 5 parts by mass or less, still more preferably 3 parts by mass or less, still more preferably 1 part by mass or less, and still more preferably 0.75 parts by mass or less from the viewpoints of improving cooling performance and suppressing deposition. From these viewpoints, the content of the viscosity improving agent is preferably 0.05 to 10 parts by mass, more preferably 0.1 to 5 parts by mass, still more preferably 0.2 to 3 parts by mass, still more preferably 0.3 to 1 part by mass, and still more preferably 0.38 to 0.75 parts by mass.

In the coolant composition according to the embodiment, a mass ratio (nonionic surfactant/anionic surfactant) of the nonionic surfactant to the anionic surfactant is preferably 0.1 or higher, more preferably 0.11 or higher, still more preferably 0.12 or higher, still more preferably 0.13 or higher, and still more preferably 0.14 or higher from the viewpoint of adjusting the shear viscosity of the coolant composition at the low temperature and the high temperature to be in the predetermined range, and is preferably 5 or lower, more preferably 4 or lower, still more preferably 3 or lower, still more preferably 2 or lower, still more preferably 1 or lower, and still more preferably 0.5 or lower from the viewpoint of adjusting the shear viscosity of the coolant composition at the low temperature to be in the predetermined range. From these viewpoints, the mass ratio of the nonionic surfactant to the anionic surfactant is preferably 0.1 to 5, more preferably 0.11 to 4, still more preferably 0.12 to 3, still more preferably 0.13 to 2, still more preferably 0.14 to 1, and still more preferably 0.14 to 0.5.

In a case where a plurality of anionic surfactants are present, the part(s) by mass of the anionic surfactants represents the total part(s) by mass of the anionic surfactants. In a case where a plurality of nonionic surfactants are present, the part(s) by mass of the nonionic surfactants represents the total part(s) by mass of the nonionic surfactants.

The shear viscosity of the coolant composition according to the embodiment is 8.5 mPa·s or higher at 25° C. and is 2.0 mPa·s or lower at 100° C.

The shear viscosity of the coolant composition according to the embodiment at 25° C. is 8.5 mPa·s or higher from the viewpoint of suppressing cooling loss at the low temperature, and is preferably 3000 mPa·s or lower from the viewpoints of avoiding a load on a water pump and suppressing deterioration in the fuel efficiency of an internal combustion engine. From these viewpoints, the shear viscosity of the coolant composition according to the embodiment at 25° C. is preferably 8.5 to 3000 mPa·s, more preferably 12 to 2000 mPa·s, still more preferably 20 to 1000 mPa·s, still more preferably 30 to 500 mPa·s, still more preferably 45 to 300 mPa·s, still more preferably 55 to 200 mPa·s, and still more preferably 65 to 100 mPa·s.

From the viewpoint of maintaining cooling performance at the high temperature and preventing overheating, the shear viscosity of the coolant composition according to the embodiment at 100° C. is 2.0 mPa·s or lower, preferably 0.2 to 1.9 mPa·s, more preferably 0.3 to 1.5 mPa·s, still more preferably 0.4 to 1.3 mPa·s, and still more preferably 0.5 to 1.1 mPa·s. The cooling performance of the coolant composition can be evaluated, for example, by evaluating the heat transmittance of a radiator. In a case where a coolant consists of 100% of water, the shear viscosity thereof at 100° C. is 0.3 mPa·s.

By further adding a viscosity improving agent such as a thickener or a viscosity reducer in addition to the viscosity improving agent according to the invention, the shear viscosity may be adjusted to be 8.5 mPa·s or higher at 25° C. and 2.0 mPa·s or lower at 100° C. The shear viscosity can be measured using a method described below in Examples.

The coolant composition according to the embodiment includes a base. The base used in the coolant composition according to the embodiment is formed of water and/or at least one alcohol selected from the group consisting of alcohols such as a monohydric alcohol, a dihydric alcohol, and a trihydric alcohol, and a glycol monoalkyl ether.

It is preferable that the coolant composition according to the embodiment includes a base having anti-freezing properties. However, in a case where anti-freezing properties are not required, the base may consist of only water.

Examples of the monohydric alcohol include a monohydric alcohol having 1 to 8 carbon atoms such as methanol, ethanol, propanol, butanol, pentanol, hexanol, heptanol, or octanol. Among these, one kind may be used alone, or a mixture of two or more kinds may be used.

Examples of the dihydric alcohol include a dihydric alcohol having 2 to 8 carbon atoms such as ethylene glycol, diethylene glycol, triethylene glycol, propylene glycol, 1,3-propanediol, 1,4-butanediol, 1,3-butanediol, 1,5-pentanediol, or hexylene glycol. Among these, one kind may be used alone, or a mixture of two or more kinds may be used.

Examples of the trihydric alcohol include a trihydric alcohol having 3 to 6 carbon atoms such as glycerin, trimethylolethane, trimethylolpropane, 5-methyl-1,2,4-heptanetriol, or 1,2,6-hexanetriol. Among these, one kind may be used alone, or a mixture of two or more kinds may be used.

Specific examples of the glycol monoalkyl ether include ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, and tetraethylene glycol monobutyl ether. Among these, one kind may be used alone, or a mixture of two or more kinds may be used. The number of carbon atoms in the alkyl group of the glycol monoalkyl ether is preferably 1 to 4, more preferably 1 or 2. The number of carbon atoms in the glycol is preferably 2 to 6 and more preferably 2.

Among the bases, ethylene glycol, propylene glycol, or 1,3-propanediol is preferable from the viewpoints of handleability, price, and availability.

Therefore, it is preferable that the base contains at least one selected from the group consisting of ethylene glycol, propylene glycol, 1,3-propanediol and water. It is more preferable that the base contains ethylene glycol and water.

As water used as the base, ion exchange water is preferable.

The content of the base with respect to 100 parts by mass of the coolant composition according to the embodiment is preferably 50 parts by mass or more, more preferably 75 parts by mass or more, still more preferably 80 parts by mass or more, and still more preferably 90 parts by mass or more from the viewpoint of functioning as a coolant, and is preferably 99.92 parts by mass or less, more preferably 99.9 parts by mass or less, still more preferably 99 parts by mass or less, and still more preferably 98 parts by mass or less from the viewpoint of adding the viscosity improving agent. From these viewpoints, the content of the base is preferably 50 to 99.92 parts by mass, more preferably 80 to 99.9 parts by mass, still more preferably 90 to 99.9 parts by mass, still more preferably 90 to 99 parts by mass, and still more preferably 90 to 98 parts by mass.

When the base includes water and the alcohol, a mixing ratio of water to the alcohol can be appropriately adjusted in consideration of anti-freezing properties and inflammability. From the viewpoint of preventing ignition, the mass ratio (water:alcohol) of water to the alcohol in the base is preferably 20:80 to 90:10 and more preferably 40:60 to 75:25.

It is preferable that the coolant composition according to the embodiment is obtained by mixing the following components with each other, the components including: the base; the viscosity improving agent; optionally a rust inhibitor; and optionally additives other than the rust inhibitor (hereinafter, also referred to as "the other additives"). It is more preferable that, after being mixed, the components are heated to a temperature (preferably 60° C. or higher and more preferably 80° C. or higher; preferably 100° C. or lower), are optionally stirred and dissolved, and then are cooled to room temperature (20° C.).

In order to efficiently suppress corrosion of metal used in an engine coolant passage, the coolant composition according to the embodiment may include at least one rust inhibitor within a range where the shear viscosity is not affected. Examples of the rust inhibitor include phosphoric acid and salts thereof; aliphatic carboxylic acids and salts thereof; aromatic carboxylic acids and salts thereof; triazoles; thiazoles; silicates; nitrates; nitrites; borates; molybdates; and amine salts. Among these, one kind may be used alone, or a mixture of two or more kinds may be used. The content of the rust inhibitor is preferably 0.01 to 8 parts by mass, more preferably 0.05 to 7 parts by mass, still more preferably 0.1 to 6 parts by mass, and still more preferably 0.1 to 5 parts by mass with respect to 100 parts by mass of the coolant composition.

In the coolant composition according to the embodiment, optionally, the other additives can be added to the base in addition to the viscosity improving agent within a range where the effects of the embodiment do not deteriorate. Examples of the other additives include a pH adjuster, a defoaming agent, a colorant, and a bittering agent. The total mixing amount of the other additives is typically 10 parts by mass or less and preferably 5 parts by mass or less with respect to 100 parts by mass of the coolant composition.

The coolant composition according to the embodiment may be obtained by adding the base and optionally the other additives to a highly concentrated composition such that the concentration of the viscosity improving agent is diluted to 1/2 to 1/100, the concentrated composition including: the viscosity improving agent; optionally a rust inhibitor and a solvent; and additives other than the rust inhibitor.

The solvent included in the concentrated composition according to the embodiment may be the same as or different from the base added to obtain the coolant composition. For example, after the concentrated composition is initially obtained using an alcohol such as ethylene glycol as the solvent, the obtained concentrated composition may be diluted by adding water as the residual base. The content of the viscosity improving agent with respect to 100 parts by mass of the concentrated composition is preferably 0.1 to 99 parts by mass, more preferably 1 to 90 parts by mass, and still more preferably 3 to 50 parts by mass. The content of the solvent with respect to 100 parts by mass of the concentrated composition is preferably 1 to 99.9 parts by mass, more preferably 50 to 99 parts by mass, and still more preferably 70 to 95 parts by mass.

In general, the coolant composition according to the embodiment can be used as a coolant and is preferably used as a coolant for an internal combustion engine. Therefore, the embodiment also relates to a method of operating an internal combustion engine in which the coolant composition according to the embodiment is used as a coolant (hereinafter, also referred to as "method of operating an internal combustion engine according to the embodiment"). In the method of operating an internal combustion engine according to the embodiment, the fuel efficiency of an internal combustion engine can be improved. The coolant composition according to the embodiment can be used as a coolant of a battery stack, a fuel cell stack, or the like.

Hereinafter, the invention will be described in more detail using Examples. However, the invention is not limited to the range of Examples.

Examples 1 to 10 and Comparative Examples 1 to 5

Materials in a formula shown in Table 1 below were added and were stirred and mixed to obtain a LLC. In Table 1, sebacic acid (manufactured by Kokura Synthetic Industries Ltd.) was used as the rust inhibitor, and potassium hydroxide (47% product; manufactured by Osaka Soda Co., Ltd.) was used as the pH adjuster.

In each of Examples and Comparative Examples, components shown in Tables 2 and 3 below were mixed, were left to stand in a thermostatic chamber at 90° C. for 1 hour, and were stirred to prepare a coolant composition.

TABLE 1

| Material | Mixing Amount (wt %) |
|---|---|
| Ethylene Glycol | 90.6 |
| Water | 1.2 |
| Rust Inhibitor | 4.2 |
| pH Adjuster | 4 |

The stability of the coolant composition obtained in each of Examples 1 to 10 and Comparative Examples 1 to 5 was determined by observing the external appearance thereof. The shear viscosity of the coolant composition obtained in each of Examples 1 to 10 and Comparative Examples 1 to 5 was measured at 25° C. and 100° C.

<Stability>

The coolant composition prepared in each of Examples and Comparative Examples was left to stand in a thermostatic chamber at 90° C. for 1 hour and was observed by visual inspection. A state where precipitation or the formation of foreign materials was not observed was evaluated as "uniform", and a state where precipitation or the formation of foreign materials was observed was evaluated as "separated".

<Method of Measuring Shear Viscosity>

The coolant composition prepared in each of Examples and Comparative Examples was left to stand in a thermostatic chamber set to a measurement temperature for 1 hour. Next, using a rheometer (Model: MCR-302; manufactured by Anton Parr GmbH) and an attachment (CP50-1; manufactured by Anton Parr GmbH), the viscosity of the coolant composition at 25° C. was measured at a rotating speed of 22/s, and the viscosity of the coolant composition at 100° C. was measured at a rotating speed of 100/s. The results are shown in Tables 2 and 3.

TABLE 2

| | | Example 1 | Example 2 | Example 3 | Example 4 | Example 5 | Example 6 |
|---|---|---|---|---|---|---|---|
| LLC | mass % | 53 | 53 | 53 | 53 | 53 | 53 |
| Water | mass % | 46.8 | 46.8 | 46.6 | 46.6 | 46.6 | 46.6 |
| Nonionic Surfactant | Kind | Nonionic Surfactant 1 | Nonionic Surfactant 1 | Nonionic Surfactant 1 | Nonionic Surfactant 1 | Nonionic Surfactant 2 | Nonionic Surfactant 2 |
| | mass % | 0.10 | 0.05 | 0.20 | 0.10 | 0.30 | 0.20 |
| Anionic Surfactant 1 | mass % | 0.10 | 0.15 | 0.20 | 0.30 | 0.10 | 0.20 |
| Total Amount of Surfactants | mass % | 0.20 | 0.20 | 0.40 | 0.40 | 0.40 | 0.40 |
| Nonionic Surfactant/ Anionic Surfactant | — | 1.00 | 0.33 | 1.00 | 0.33 | 3.00 | 1.00 |

TABLE 2-continued

|  |  |  |  |  |  |  |
|---|---|---|---|---|---|---|
| (mass ratio) |  |  |  |  |  |  |
| Shear Viscosity (25° C., 22/s) | mPa·s | 24 | 39 | 63 | 69 | 28 | 68 |
| Shear Viscosity (100° C., 100/s) | mPa·s | 1.3 | 1.0 | 1.7 | 1.2 | 1.3 | 1.0 |
| Stability | State | Uniform | Uniform | Uniform | Uniform | Uniform | Uniform |

|  |  | Example 7 | Example 8 | Example 9 | Example 10 |
|---|---|---|---|---|---|
| LLC | mass % | 53 | 53 | 53 | 53 |
| Water | mass % | 46.6 | 46.6 | 46.6 | 46.6 |
| Nonionic Surfactant | Kind | Nonionic Surfactant 2 | Nonionic Surfactant 2 | Nonionic Surfactant 3 | Nonionic Surfactant 3 |
|  | mass % | 0.10 | 0.05 | 0.20 | 0.10 |
| Anionic Surfactant 1 | mass % | 0.30 | 0.35 | 0.20 | 0.30 |
| Total Amount of Surfactants | mass % | 0.40 | 0.40 | 0.40 | 0.40 |
| Nonionic Surfactant/ Anionic Surfactant (mass ratio) | — | 0.33 | 0.14 | 1.00 | 0.33 |
| Shear Viscosity (25° C., 22/s) | mPa·s | 77 | 67 | 18 | 69 |
| Shear Viscosity (100° C., 100/s) | mPa·s | 1.2 | 0.98 | 1.2 | 0.97 |
| Stability | State | Uniform | Uniform | Uniform | Uniform |

Anionic Surfactant 1: $C_{22}H_{45}O-(CH_2CH_2O)_4-SO_3Na$
Nonionic Surfactant 1: $C_{18}H_{37}O-(CH_2CH_2O)_6-H$
Nonionic Surfactant 2: $C_{22}H_{45}O-(CH_2CH_2O)_7-H$
Nonionic Surfactant 3: $C_{22}H_{45}O-(CH_2CH_2O)_{10}-H$

TABLE 3

|  |  | Comparative Example 1 | Comparative Example 2 | Comparative Example 3 | Comparative Example 4 | Comparative Example 5 |
|---|---|---|---|---|---|---|
| LLC | mass % | 53 | 53 | 53 | 53 | 53 |
| Water | mass % | 47 | 46.8 | 46.6 | 46.6 | 46.6 |
| Nonionic Surfactant | Kind | None | Nonionic Surfactant 1 | Nonionic Surfactant 1 | Nonionic Surfactant 2 | Nonionic Surfactant 3 |
|  | mass % | 0.00 | 0.20 | 0.40 | 0.40 | 0.40 |
| Anionic Surfactant 1 | mass % | 0.00 | 0.00 | 0.00 | 0.00 | 0.00 |
| Total Amount of Surfactant | mass % | 0.00 | 0.20 | 0.40 | 0.40 | 0.40 |
| Nonionic Surfactant/ Anionic surfactant (mass ratio) | — | — | — | — | — | — |
| Shear Viscosity (25° C., 22/s) | mPa·s | 3.7 | 17 | 49 | 4.7 | 4.6 |
| Shear Viscosity (100° C., 100/s) | mPa·s | 0.90 | 1.1 | 1.4 | 1.3 | 1.1 |
| Stability | State | Uniform | Separated | Separated | Separated | Separated |

Anionic Surfactant 1: $C_{22}H_{45}O-(CH_2CH_2O)_4-SO_3Na$
Nonionic Surfactant 1: $C_{18}H_{37}O-(CH_2CH_2O)_6-H$
Nonionic Surfactant 2: $C_{22}H_{45}O-(CH_2CH_2O)_7-H$
Nonionic Surfactant 3: $C_{22}H_{45}O-(CH_2CH_2O)_{10}-H$ It can be seen from Tables 2 and 3 that, in the coolant compositions according to Examples 1 and 2, the shear viscosity at 25° C. was higher than that of the coolant composition according to Comparative Example 2 on the condition that the amount of the viscosity improving agent used was the same. It can be seen from Tables 2 and 3 that, in the coolant compositions according to Examples 3 and 4, the shear viscosity at 25° C. was higher than that of the coolant composition according to Comparative Example 3 on the condition that the amount of the viscosity improving agent used was the same. It can be seen from Tables 2 and 3 that, in the coolant compositions according to Examples 5 to 8, the shear viscosity at 25° C. was higher than that of the coolant composition according to Comparative Example 4 on the condition that the amount of the viscosity improving agent used was the same. It can be seen from Tables 2 and 3 that, in the coolant compositions according to Examples 9 and 10, the shear viscosity at 25° C. was higher than that of the coolant composition according to Comparative Example 5 on the condition that the amount of the viscosity improving agent used was the same.

The coolant composition according to the embodiment is preferably used for cooling an internal combustion engine (including a hybrid system) of a vehicle such as an automobile or a working vehicle (for example, a truck or a heavy machinery), a ship, an airplane, a power generator, or a heating and cooling system and for cooling a battery or a fuel cell.

What is claimed is:

1. A coolant composition comprising a viscosity improving agent and a base, wherein
the viscosity improving agent includes at least one nonionic surfactant and at least one anionic surfactant represented by the following Formula (1), $$R^1O-(R^2O)_m-SO_3M \quad (1)$$

where $R^1$ represents a linear or branched alkyl group having 16 to 24 carbon atoms or a linear or branched alkenyl group having 16 to 24 carbon atoms, $R^2$ represents an ethylene group or a propylene group, m represents an average addition molar number of $R^2O$ which is a number of 0.5 to 10, and M represents a cation or a hydrogen atom,
the base is formed of water and/or at least one alcohol selected from the group consisting of a monohydric alcohol, a dihydric alcohol, a trihydric alcohol, and a glycol monoalkyl ether, and
a shear viscosity of the coolant composition is 8.5 mPa·s or higher at 25° C. and is 2.0 mPa·s or lower at 100° C.

2. The coolant composition according to claim 1, wherein the nonionic surfactant is at least one selected from the group consisting of polyoxyalkylene alkyl ether, polyoxyalkylene alkyl phenyl ether, polyoxyalkylene polyol ether, polyoxyalkylene alkyl amino ether, polyoxyalkylene fatty acid ester, polyoxyalkylene sorbitan ester, and polyoxyalkylene fatty acid amide.

3. The coolant composition according to claim 2, wherein the polyoxyalkylene alkyl ether is a compound represented by the following Formula (2), $$R^3O-(R^4O)_n-H \quad (2)$$

where $R^3$ represents a linear or branched alkyl group having 12 to 24 carbon atoms or a linear or branched alkenyl group having 12 to 24 carbon atoms, $R^4$ represents an ethylene group or a propylene group, and n represents an average addition molar number of $R^4O$ which is a number of 0.5 to 20.

4. The coolant composition according to claim 1, wherein a content of the viscosity improving agent is 0.05 to 10 parts by mass with respect to 100 parts by mass of the coolant composition.

5. The coolant composition according to claim 1, wherein a mass ratio of the nonionic surfactant to the anionic surfactant is 0.1 to 5.

6. The coolant composition according to claim 1, further comprising:
a rust inhibitor.

7. A method of operating an internal combustion engine wherein
the coolant composition according to claim 1 is used as a coolant.

* * * * *